United States Patent [19]

Girard et al.

[11] 4,061,584
[45] * Dec. 6, 1977

[54] HIGH DIELECTRIC CONSTANT INK FOR THICK FILM CAPACITORS

[75] Inventors: Roland T. Girard, Scotia; George A. Rice, Schenectady, both of N.Y.

[73] Assignee: General Electric Company, Schenectady, N.Y.

[*] Notice: The portion of the term of this patent subsequent to Apr. 15, 1992, has been disclaimed.

[21] Appl. No.: 651,407

[22] Filed: Jan. 22, 1976

Related U.S. Application Data

[60] Division of Ser. No. 532,454, Dec. 13, 1974, Pat. No. 3,968,412, which is a continuation-in-part of Ser. No. 383,280, July 27, 1973, Pat. No. 3,878,443.

[51] Int. Cl.² .............................................. H01G 4/12
[52] U.S. Cl. ................................. 252/63; 106/47 R; 106/52; 106/54; 106/73.3; 106/73.31; 252/63.2; 252/63.5; 361/320; 427/126
[58] Field of Search ................... 317/258; 427/126; 106/73.3, 73.31, 47 R, 52, 54; 252/63, 63.2, 63.5, 518.1; 361/320

[56] References Cited

U.S. PATENT DOCUMENTS

| 3,293,077 | 12/1966 | Kaiser et al. | 317/258 |
|---|---|---|---|
| 3,394,290 | 7/1968 | Boykin | 252/63.2 |
| 3,582,729 | 6/1971 | Girard et al. | 252/63.2 |
| 3,778,285 | 12/1973 | Mason | 252/63.2 |
| 3,787,219 | 1/1974 | Amin | 317/258 |
| 3,816,172 | 6/1974 | Hoffman | 252/63.2 |
| 3,878,443 | 4/1975 | Girard et al. | 317/258 |

Primary Examiner—Mayer Weinblatt
Assistant Examiner—John D. Smith
Attorney, Agent, or Firm—Donald M. Winegar; Joseph T. Cohen; Jerome C. Squillaro

[57] ABSTRACT

An improved high dielectric constant ink useful in making thick film capacitors is disclosed in which a dielectric material is combined with a glass bonding agent having at least one electropositive element therein which is common with the powdered, high dielectric material which is one selected from the group consisting of chemically pure barium titanate and chemically pure barium titanate modified with from about 0.125% to about 5.0% by weight of a metal oxide additive. The glass bonding agent is an alkali-free binder comprising from 3 percent to 7 percent by total weight of the dielectric and binder materials.

11 Claims, 1 Drawing Figure

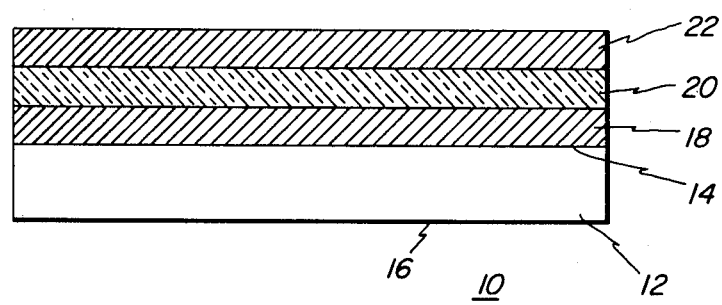

HIGH DIELECTRIC CONSTANT INK FOR THICK FILM CAPACITORS

CROSS-REFERENCE TO RELATED PATENT APPLICATION

This patent application is a division of our copending patent application, Ser. No. 532,454, filed Dec. 13, 1974 and now U.S. Pat. No. 3,968,412, and which is a Continuation-In-Part of our copending patent application, Ser. No. 383,280, filed on July 27, 1973, now U.S. Pat. No. 3,878,443 and both of which are assigned to the same assignee as this patent application.

BACKGROUND OF THE INVENTION

1. Field of the Invention

This invention relates to thick film capacitors and, in particular, to a high dielectric constant material for making such capacitors.

2. Background of the Invention

In the semiconductor art, the use of discrete (separate) devices mounted on a printed circuit board is increasingly giving way to the fabrication of complete circuits in a single package containing a ceramic substrate. Devices, such as resistors and capacitors, as well as their electric interconnections, are formed on the substrate by screen printing.

Screen printing, as is known in the art, entails forcing a liquid mixture through a patterned screen to print the components on the substrate. The substrate is then dried and fired to harden the materials in place. The screen may comprise silk, stainless steel, or other appropriate material depending upon the device being printed. The liquid mixture, herein referred to as an "ink", comprises finely divided particles, a binder, and a liquid vehicle.

Screen printing, however, poses special problems for forming capacitors. The dielectric material for the capacitors must be in the form of finely ground particles suspended in a liquid vehicle. The electric properties of the dielectric material are not the same for the bulk and the finely ground, printed and fired conditions. Thus, there is a problem producing high dielectric constants in screen printed capacitors due to the fact that the deposited material must be finely ground particles which cannot be brought back to their original, high density.

Other difficulties arise from the binders needed to hold the particles together during firing. The material used as the binder can contribute to poor dielectric constant and high dissipation factor by reacting with the dielectric during firing. Further, the firing temperatures of the less costly electrode materials are generally lower than ideal for binders which would not detract from dielectric properties. Noble metal electrodes, which can withstand higher firing temperatures, are generally too expensive for most applications. Additionally, the firing of the dielectric material in contact with the less costly electrical conductors may produce a high temperature chemical reaction between the electrode and the dielectric because of their incorporated binders.

Yet another difficulty that must be overcome is the aging characteristics of the dielectric, i.e. change in dielectric constant on the shelf and also at elevated temperatures or at high applied voltages. For example, presently used high dielectric constant materials change in dielectric constant by approximately 22% in the temperature range of from 100° C to 150° C, and by approximately 33% over an applied voltage range of from 0 to 167 volts per mil thickness.

It has been difficult up until this time to overcome these difficulties simultaneously with presently available dielectric inks, particularly in finding a suitable binder material for incorporation therein.

In view of the foregoing, it is therefore an object of the present invention to provide an improved dielectric ink for thick film capacitors.

Another object of the present invention is to provide an improved binder for dielectric inks that does not deteriorate the dielectric constant of the resulting material.

A further object of the present invention is to provide an improved dielectric that is more resistant to aging effects.

DESCRIPTION OF THE DRAWING

The drawing is a side elevation view in cross-section of a capacitor made in accordance with the teachings of this invention.

DESCRIPTION OF THE INVENTION

Referring to the Figure, there is shown a thick film capacitor 10 embodying the high dielectric constant dielectric material of this invention. The capacitor 10 comprises a substrate 12 having opposed major surfaces 14 and 16 being the respective top and bottom surfaces thereof. The substrate 12 is made of a suitable material such, for example, as alumina, beryllia, mullite and forsterite.

A layer 18 of a suitable electrically conducting metal such, for example, as a palladium-silver alloy, platinum, a platinum-palladium alloy and a platinum-gold alloy is deposited on the surface 14 of the substrate 12. The layer 18 functions as the first electrode of the capacitor. Preferably, the layer 18 is deposited on the surface 14 by screen printing and firing at the recommended temperature for the selected electrode material.

A layer 20 of a dielectric material 18, made in accordance with the teachings of this invention, is disposed on the layer 18 by printing, preferably through a 140 mesh U.S. series stainless steel screen. A thickness of from 0.0005 to 0.0015 is preferred for the layer 18 prior to firing in place to assure one of a pin-hole free layer. The layer 20 is substantially a uniform thickness throughout the layer.

The dielectric material is fired in place at a temperature of from 850° C ± 25° C to 1075° C ± 25° C.

A layer 22 of an electrically conductive metal is then disposed on the layer 20 of dielectric material in the same manner as the layer 18. Preferably, the metal of the layer 22 is the same as the metal of the layer 18. Alternately the metal of the layer 22 may be of another metal as long as it is able to withstand the temperatures of the manufacturing processes and it does not detrimentally affect the material of the dielectric layer 20. The metal layer 22 functions as the second electrode of the capacitor 10.

The dielectric material of the layer 20 comprises an alkali-free glass binder including at least one electropositive element common to the dielectric material. The dielectric material as a result of the particular glass binder has a high dielectric constant and a better resistance to aging effects. The exact high temperature mechanism and what produces the aging characteristics is not fully understood by the Applicants. However, it is believed that the presence of the common electro-positive element in the glass binder prevents, or acts as a substitute for, reactions with that common element in the dielectric material.

The improvement in the dielectric constant of the dielectric material is noted when a second firing of the dielectric material occurs. The second firing occurs because the layer 22 of metal comprising the second electrode is fired in place to form a good electrical conductive relationship between the electrode 27 and the dielectric material 20. The variation in dielectric constant K with the firing of the second electrode, that is to say, the improvement in the dielectric constant with a second firing has been tabulated and is shown in Table I.

Table I

| Ba Glass | BaTiO$_3$ (CP) Second electrode firing | | K |
|---|---|---|---|
| | Temp. (° C) | Time (Min) | |
| 3% | 850 | 10 | 580 |
| 5% | 850 | 10 | 570 |
| 7% | 850 | 10 | 530 |
| 3% | 1050 | 12 | 790 |
| 5% | 1050 | 12 | 930 |
| 7% | 1050 | 12 | 760 |

The dielectric material of Table I was prepared from chemically pure (CP) barium titanate and different percentages by weight of glass binder relative to the dielectric material.

Preparation of the capacitor ink is as follows:

chemically pure barium titanate is milled in acetone to break down agglomerated particles. After drying, the particles are mixed with a solution of ethyl cellulose in pine oil, by means of a mortar and pestle, in the following proportions:

| Barium Titanate | (CP) | 24 gms. | |
|---|---|---|---|
| Ethyl Cellulose Solution | | 10 gms. | (60 cc pine oil (8 gms. ethyl cellulose |

The barium zinc glass used as the binder is prepared by weighing out the proportions of oxides and wet mixing them in acetone. After drying, the mixture is smelted in a platinum crucible heated to an elevated temperature of approximately 1390° C ± 25° C using a platinum stirrer to insure uniformity. The melt is then poured on a steel chill plate after which it is pulverized and ground to 1 to 2 micron particle size and mixed with the barium titanate and ethyl cellulose solution.

The capacitor ink thus formed, when printed through a 165 mesh stainless steel screen, produces a pin-hole free dielectric of approximately uniform thickness. The dielectric exhibits high dielectric constant, as shown in Table I, and good aging characteristics. For example, the dielectric constant varies by approximately 19% over a temperature range of 100° C to 150° C and varies by approximately 22% over an applied voltage range of 0–167 volts per mil.

The glass binder utilized in Table I is fired at 1050° C ± 25° C for 12 minutes for all samples and comprises a barium zinc glass having the following composition by oxide percent:

| Material | Range-% by oxide | Preferred-% by oxide |
|---|---|---|
| BaO | 38 – 46 | 42 |
| ZnO | 7 – 11 | 9 |
| SiO$_2$ | 35 – 45 | 40 |
| B$_2$O$_3$ | 6 – 8 | 6 |
| Al$_2$O$_3$ | 2 – 5 | 3 |

For Tables II and III, the dielectric material comprises modified barium titanate, that is, a mixture of barium titanate and barium stannate. The modified barium titanate ranges from 82 percent by weight to 86 percent by weight and the remainder is barium stannate. Preferably, the dielectric material comprises 84% barium titanate and 16% barium stannate by weight.

As is known, chemically pure barium titanate exhibits a variation in dielectric constant with temperature. Specifically, in a curve of the variation of dielectric constant with temperature, a pronounced peak occurs at approximately 125° C. The dielectric constant varies from about 1500 at 25° C to from 6,000 to 10,000 at 125° C. This wide variation in dielectric constant must be allowed for in circuitry utilizing the chemically pure barium titanate as a dielectric. Modified barium titanate on the other hand, has a dielectric constant that is relatively uniform, approximately 2000, over a wide temperature range from about 50° C to about 150° C.

Table II comprises examples of the present invention utilizing modified barium titanate as the dielectric material with 3 and 7 percent by weight barium zinc glass binder. Table II further shows that the dielectric constant is electrode dependent, i.e. the choice of electrode material may increase or decrease the dielectric constant, even with the same dielectric material. Further, even with the preferred palladium-silver electrodes, some variation in dielectric constant is obtained depending upon the electrode paste or ink utilized.

Table II

| Modified BaTiO$_3$ (84% BaTiO$_4$ + 16% BaSnO$_3$) | | |
|---|---|---|
| Ba Glass By Weight Total Composition | Metal Type | K |
| 3% | 8151 | 1002 |
| 7% | 8151 | 873 |
| 3% | 8228 | 723 |
| 7% | 8228 | 557 |

It is evident from the results obtained as tabulated in Table II that although both materials were palladium-silver compositions, that something else was present in the composition material. Each metal material employed a different glass binder to enhance adherence to the dielectric material layer. It is believed that a difference in the glass binder material caused the difference in the K values.

In Table III, which follows, the dielectric material comprises modified barium titanate, 84% BaTiO$_3$ and 16% BaSnO$_3$, but the glass binder comprises a glass containing both barium and titanate. The glass contains the one electro-positive element in common with a titanium dioxide additive in the dielectric material. A similar variation in dielectric constant with the electrode material employed is to be noted.

Table III

| BaTiO$_3$ Bearing Glass By Weight of Total Composition | Metal Type | K |
|---|---|---|
| 3% | 8151 | 845 |
| 7% | 8151 | 696 |
| 3% | 8228 | 746 |
| 7% | 8228 | 696 |

The Ba-TiO₃ bearing glass composition by oxide percent is as follows:

| Material | Range % by oxide | Preferred % by oxide |
|---|---|---|
| BaO | 38 to 46 | 42.05 |
| ZnO | 7 to 11 | 9.00 |
| SiO$_2$ | 35 to 45 | 35.59 |
| B$_2$O$_3$ | 6 to 8 | 5.96 |
| Al$_2$O$_3$ | 2 to 5 | 2.67 |
| TiO$_2$ | 3 to 10 | 4.73 |

In addition to modifying chemically pure barium titanate with barium stannate, small amounts of metal oxide additives may also be employed. Such suitable metal oxide additives are lanthanum oxide, cerium compounds, stannates, zirconates, neodymium oxide, bismuth compounds and the like. These metal oxide additives comprise from 0.125 to 5% by oxide weight of the modified dielectric material.

There is thus provided by the present invention an improved binder for thick film printed capacitor dielectrics that does not contribute to poor dielectric constant or react as readily with the dielectric material during firing. Further, the glass binder provides a resulting dielectric having improved aging characteristics, enabling a capacitor formed therewith to withstand higher voltages than obtainable in the prior art.

Having thus described the invention, it will be apparent to those skilled in the art that various modifications may be made within the spirit and scope of the present invention.

We claim as our invention:

1. An improved dielectric ink for thick film printing consisting of:
   a powdered, high dielectric constant material which includes a barium titanate material which is one selected from the group consisting of chemically pure barium titanate and chemically pure barium titanate modified with from about 0.125% to about 5.0% by weight of a metal oxide additive;
   an alkali-free glass binder comprising from 3 percent to 7 percent by total weight of the dielectric and binder materials, the binder having at least the electropositive element barium present therein, the alkali-free glass has the following formulation:

| Ingredient | % by weight |
|---|---|
| BaO | 38 to 46 |
| ZnO | 7 to 11 |
| SiO$_2$ | 35 to 45 |
| B$_2$O$_3$ | 6 to 8 |
| Al$_2$O$_3$ | 2 to 5 | and
   a liquid vehicle for said dielectric and binder materials.

2. An improved dielectric ink as set forth in claim 1 wherein said powdered, high dielectric constant material comprises barium titanate.

3. An improved dielectric ink as set forth in claim 1 wherein said dielectric material is modified barium titanate, comprising from 82% to 86% by weight barium titanate, balance barium stannate.

4. An improved dielectric ink as set forth in claim 1 wherein the alkali-free glass binder has the following formation:

| Ingredient | % by weight |
|---|---|
| BaO | 42 |
| ZnO | 9 |
| SiO$_2$ | 40 |
| B$_2$O$_3$ | 6 |
| Al$_2$O$_3$ | 3. |

5. An improved dielectric ink as set forth in claim 1 wherein the dielectric material composition is a modified barium titanate and the metal oxide additive is one selected from the class of materials consisting of lanthanum oxide, cerium compounds, stannates, zirconates, neodymium oxide and bismuth compounds.

6. An improved dielectric ink as set forth in claim 1 wherein the alkali-free glass binder includes titanium dioxide as an additive material.

7. An improved dielectric ink as set forth in claim 6 wherein the alkali-free glass binder has the following formulation:

| Ingredient | % by weight |
|---|---|
| BaO | 38–46 |
| ZnO | 7–11 |
| SiO$_2$ | 35–45 |
| B$_2$O$_3$ | 6–8 |
| Al$_2$O$_3$ | 2–5 |
| TiO$_2$ | 3–10. |

8. The improved dielectric ink as set forth in claim 7 wherein the alkali-free glass binder has the following formulation:

| Ingredient | % by weight |
|---|---|
| BaO | 42.05 |
| ZnO | 9.00 |
| SiO$_2$ | 35.59 |
| B$_2$O$_3$ | 5.96 |
| Al$_2$O$_3$ | 2.67 |
| TiO$_2$ | 4.73. |

9. An improved dielectric ink as set forth in claim 8 wherein the dielectric material comprises from 82% to 86% by weight barium titanate and the remainder is barium stannate.

10. An improved dielectric ink as set forth in claim 6 wherein the dielectric material comprises from 82% to 86% by weight barium titanate and the remainder is barium stannate.

11. An improved dielectric ink as set forth in claim 10 wherein said glass binder comprises 3% by weight of said ink.

* * * * *